US012641328B2

(12) United States Patent
Duckett, III

(10) Patent No.: US 12,641,328 B2
(45) Date of Patent: May 26, 2026

(54) DUAL MAGNIFICATION FLUORESCENCE IMAGING CAMERA

(71) Applicant: KARL STORZ Imaging, Inc., Goleta, CA (US)

(72) Inventor: George E. Duckett, III, Castaic, CA (US)

(73) Assignee: KARL STORZ Imaging, Inc., Goleta, CA (US)

( * ) Notice: Subject to any disclaimer, the term of this patent is extended or adjusted under 35 U.S.C. 154(b) by 309 days.

(21) Appl. No.: 18/498,935

(22) Filed: Oct. 31, 2023

(65) Prior Publication Data

US 2025/0142186 A1    May 1, 2025

(51) Int. Cl.
*H04N 23/16* (2023.01)
*G02B 27/10* (2006.01)

(52) U.S. Cl.
CPC ......... *H04N 23/16* (2023.01); *G02B 27/1013* (2013.01)

(58) Field of Classification Search
CPC ................ H04N 23/16; G02B 27/1013; A61B 1/00186; A61B 1/0019; A61B 1/043
See application file for complete search history.

(56) References Cited

U.S. PATENT DOCUMENTS

| | | | | |
|---|---|---|---|---|
| 2002/0035330 A1* | 3/2002 | Cline | ..................... | A61B 1/045 |
| | | | | 600/478 |
| 2002/0159030 A1 | 10/2002 | Frey et al. | | |
| 2010/0245550 A1* | 9/2010 | Ishihara | ........... | A61B 1/000095 |
| | | | | 348/E7.085 |

| | | | | |
|---|---|---|---|---|
| 2011/0112408 A1* | 5/2011 | Greenstein | ........... | A61B 5/7282 |
| | | | | 606/18 |
| 2011/0249323 A1* | 10/2011 | Tesar | ................. | A61B 1/00126 |
| | | | | 359/356 |
| 2012/0140037 A1 | 6/2012 | Galstian et al. | | |

(Continued)

FOREIGN PATENT DOCUMENTS

| | | | | |
|---|---|---|---|---|
| EP | 2609849 A1 * | 7/2013 | ............... | A61B 1/07 |
| WO | 2019191497 A1 | 10/2019 | | |
| WO | WO-2023045146 A1 * | 3/2023 | ............... | A61B 5/00 |

OTHER PUBLICATIONS

Maki-Mantilla, M, European Search Report and Written Opinion, Feb. 25, 2025, pp. 1-9, European Patent Office, Munich.

*Primary Examiner* — Abdelaaziz Tissire
(74) *Attorney, Agent, or Firm* — David N. Villalpando; Jason Worgull; Jacqueline Cohen

(57) ABSTRACT

A video camera device and system for white light and fluorescence imaging performs imaging for both fluorescence and non-fluorescence light collected from an illuminated scene. A beamsplitter downstream from an optical subsystem separates light a non-fluorescence image into a first imaging channel for and light for a fluorescence image into a second imaging channel. A meniscus lens is positioned downstream from the beamsplitter in one of the first and second imaging channels, and functions to change a magnification such that a magnification of the first image channel is different from a magnification of the second imaging channel. One or more image sensors downstream of the beamsplitter capture the fluorescence and non-fluorescence image light as a fluorescence image and a non-fluorescence image. The fluorescence image has an image size with a smaller area on the sensor or sensors than an image size of the non-fluorescence image.

23 Claims, 8 Drawing Sheets

(56) References Cited

U.S. PATENT DOCUMENTS

| 2014/0225992 | A1 |  | 8/2014 | Mcdowall |
| 2018/0000401 | A1 | * | 1/2018 | Kang ..................... A61B 1/063 |
| 2019/0004305 | A1 | * | 1/2019 | Duckett, III ....... A61B 1/00096 |
| 2019/0391383 | A1 | * | 12/2019 | Duckett, III ........... A61B 1/055 |
| 2020/0088579 | A1 |  | 3/2020 | Balas |
| 2020/0107710 | A1 |  | 4/2020 | Duckett et al. |
| 2020/0124417 | A1 |  | 4/2020 | Vogel et al. |
| 2021/0015350 | A1 | * | 1/2021 | Butte ................. G02B 21/0012 |
| 2021/0157057 | A1 | * | 5/2021 | Duckett, III ....... A61B 1/00096 |
| 2021/0307613 | A1 |  | 10/2021 | Stead et al. |
| 2023/0222654 | A1 |  | 7/2023 | Fan et al. |

* cited by examiner

DUAL MAGNIFICATION FLUORESCENCE IMAGING CAMERA

TECHNICAL FIELD

This disclosure relates to a system for collecting reflected and/or scattered light from a scene in addition to fluorescence emission light. The disclosure relates more particularly to an imaging camera head connected to an endoscope for performing both visible light and fluorescence imaging (FI).

BACKGROUND

Scopes for use in medical and/or industrial applications, such as endoscopes, exoscopes, and borescopes, may utilize both white light imaging and fluorescence imaging (FI). Endoscopic instruments intended for industrial use, rather than medical use, are often referred to as borescopes. As this invention relates to both medical endoscopes and exoscopes, and borescopes the term "endoscope" is used to generally include all of these instruments. Conventional endoscopes able to capture both white light and fluorescence images with a single optical path and only a single image sensor do so by collecting alternating frames with staggered white light and excitation illumination. Such system arrangement results in a frame rate that is significantly lower than a frame rate of a system using only visible white light, typically reaching, at most, half of the frame rate of a white light only system. The low frame rate leads to unwanted motion blurring. In addition to the necessary shuttering between white light and fluorescence frames, the sensitivity of the fluorescence frames is limited by the shared optical path, which typically results in the inability to attenuate one signal relative to the other signal. Image processing subsequently analyzes and combines the images from alternating frames into a fluorescence/white light overlay with a low overall frame rate. This technique results in a lower sensitivity in the fluorescence range as well as a reduced brightness and resolution of the overlaid image compared to a white light only image.

The fluorescence image, resulting from fluorescent light emitted from the scene, generally as a result of a fluorophore being exposed to excitation light, is often much weaker than the corresponding white light (visible spectrum) image, which can make simultaneous imaging on a single camera chip difficult. Further, it is difficult to focus the fluorescence image independently of the white light image in a single chip system. The chromatic aberration of some endoscopes is such that the white light image and infrared fluorescence image are not in simultaneous focus. While this can be corrected by a fixed focus offset in the camera head for a single endoscope, it is typically the case that different models of endoscopes have different offsets. Furthermore, the fluorescence image may be emitted from a different object plane in the object space than the white light image, such as when the fluorescence is generated in blood vessels lying below the surface of the skin and the white light image is from light reflected and scattered from the surface of the skin.

US 2020/0088579 A1 discloses a hybrid spectral imager comprising multiband filtering optics with a beam divider means for generating at least two replica images of a target image and a tunable multiband filtering means interposed into the imaging path and effecting a tunable multiband pass filtering in the image replicas. The beam divider can be a pentaprism, wherein one of its five surfaces is coated with a polychroic mirror substrate and this coated surface is cemented together with a triangle prism for making the prism's rear surface parallel to the front surface of the pentaprism. Furthermore, the pentaprism comprises a tilting actuator to adjust the tilting angle of the prism assembly and therewith the direction of the imaging ray beams. The images of a target object are focused by an objective lens optics and divided by the tilting prism assembly onto two image sensors, wherein, at each tilting step, a new set of images is obtained simultaneously in a snapshot mode, so that, in a scanning mode, the entire spectrum can be scanned to create a complete spectral cube for the target object. Hereby, for adapting to a variety of sizes of sensor arrays, the path lengths of the two split beams have to be substantially equal. Consequently, the arrangement of this hybrid spectral imager in a narrow shaft of a COTT endoscope is limited.

In US 2014/0225992 A1 a minimally invasive surgical system with an image capture unit including a prism assembly and a sensor assembly is described. The image capture unit includes a shared lens assembly followed by a sensor assembly, wherein the sensor assembly includes a prism assembly, a reflective unit and co-planar image capture sensors. Hereby, the two image capture sensors having similar image sizes are symmetric across a plane that intersects the longitudinal axis of the stereoscopic endoscope and only a small gap is arranged between the respective surface of the prism assembly and each co-planar image capture sensor.

In US 2021/0307613 A1 a fluorescence imaging system for imaging an object includes a white light emitter, an excitation light emitter that plurality of excitation wavebands for causing the object to emit fluorescent light, a component that directs the white light and excitation light to the object and collects reflected white light and emitted fluorescent light from the object, a filter that blocks light in the excitation wavebands and transmits at least a portion of the reflected white light and fluorescent light, and an image sensor assembly that receives the transmitted reflected white light and the fluorescent light. Various prism and reflective arrangements are described to direct the fluorescent light and white light along different optical paths.

BRIEF DESCRIPTION OF THE INVENTION

It is an object of the invention to provide for improved endoscope acquisition of dual images and allow the use of varied existing endoscopes for dual imaging applications. It is a further object of the invention to provide for improved compatibility of video camera devices for dual acquisition with a variety of endoscope devices in which the dual images have video stream has different characteristics such as differing collected light spectra, different image focal planes or focal depths, or differing light intensities. It is a further object of the invention to improve such compatibility while providing improved signal to noise characteristics.

According to a first aspect of the invention, a video camera device is provided for white light and fluorescence imaging, and includes a first optical subsystem, a beamsplitter, a meniscus lens, and one or more image sensors. The first optical subsystem transmits reflected and scattered light for a non-fluorescent image and transmits emitted fluorescence light for a fluorescence image, both fluorescence and non-fluorescence light collected from an illuminated scene. The beamsplitter is positioned downstream from the first optical subsystem and separates the light for said non-fluorescence image into a first imaging channel for and light for said fluorescence image into a second imaging channel. The meniscus lens is positioned downstream from the beamsplitter in one of the first and second imaging channels, and functions to change a magnification such that a magnification of the first image channel is different from a magnification of the second imaging channel. The one or more image sensors are positioned downstream of the beamsplitter to receive the fluorescence and non-florescence light. The image sensor or sensors are configured to capture the fluorescence and non-fluorescence image light as a fluorescence image and a non-fluorescence image, and wherein the fluorescence image has an image size with a smaller area on the sensor or sensors than an image size of the non-fluorescence image.

According to some implementations of the first aspect, the light from the first imaging channel is imaged onto a first image location of the one or more image sensors and light from the second image channel is imaged onto a second image location of the one or more image sensors distinct from the first image location. A processor may be included, in communication with the one or more image sensors to receive captured fluorescence image and non-fluorescence image from the first imaging channel and the second imaging channel, said processor configured to digitally rescale the fluorescence image to match the size of the non-fluorescence image and overlay it onto non-fluorescence image for display. The first and second image locations may be distinct and separate regions of a single focal plane array image sensor, or may be on two separate focal plane array image sensors.

According to some implementations of the first aspect, the meniscus lens is a singlet.

According to some implementations of the first aspect, the meniscus lens is a doublet with an overall meniscus shape adapted for correcting chromatic aberrations in white light.

According to some implementations of the first aspect, the magnification of the second imaging channel is 0.5× to 0.9× the magnification of the first imaging channel. The meniscus lens may function to reduce the magnification of the second imaging channel.

According to some implementations of the first aspect, the meniscus lens has a first radius r1 and a second radius r2, with a magnification m equal to r2/r1 being between about 0.56 and 0.88.

According to some implementations of the first aspect, the beamsplitter reflects light of wavelengths corresponding to the fluorescence channel and transmits light of wavelengths corresponding to the non-fluorescent channel.

According to some implementations of the first aspect, the beamsplitter transmits light of wavelengths corresponding to the fluorescence channel and reflects light of wavelengths corresponding to the non-fluorescent channel.

According to some implementations of the first aspect, the beamsplitter reflects ICG/OTL fluorescent light having wavelengths approximately 800-850 nm and transmits light of shorter wavelengths.

According to some implementations of the first aspect, the beamsplitter transmits ICG/OTL fluorescent light having wavelengths approximately 800-850 nm and reflects light of shorter wavelengths.

According to some implementations of the first aspect, the beamsplitter reflects Cy5 or Cy5.5 fluorescent light having wavelengths approximately 650-725 nm and transmits light of shorter wavelengths.

According to some implementations of the first aspect, the beamsplitter transmits Cy5 or Cy5.5 fluorescent light having wavelengths approximately 650-725 nm and reflects light of shorter wavelengths.

According to some implementations of the first aspect, the beamsplitter reflects fluorescein fluorescent light having wavelengths approximately 500-550 nm and transmits light of other wavelengths.

According to some implementations of the first aspect, the beamsplitter transmits fluorescein fluorescent light having wavelengths approximately 500-550 nm and reflects light of other wavelengths.

According to some implementations of the first aspect, the video camera device further includes a means to focus one of the first imaging channel and the second imaging differently than the other. The meniscus lens may be afocal. The focusing means may include a mechanism for moving the meniscus lens. The moving of the meniscus lens may be done in such a manner that it does not change the magnification of the image light passing therethrough. The focusing means may include a mechanism for moving an image sensor corresponding to one of the imaging channels. The focusing means may include a liquid lens having an adjustable deformation. A processor may be included which is operable to control the focusing means and which performs an autofocus routine to adjusts the focus of one of the imaging channels automatically.

According to a second aspect of the invention, an optical imaging system is provided including a video camera device of the first aspect and a system controller which is configured to provide image processing and display control functions, and perform functions such as rescaling a demagnified FI image provided by the video camera device, or a magnified white light image, such that the two images are at or near the same size. The system controller may also control focal adjustments by operating autofocus algorithms to make focal adjustments based either white light imagery imaging or fluorescence imagery imaging, and send appropriate control signals to the video camera device.

These and other features of the invention will be apparent from the following description of the preferred embodiments, considered along with the accompanying drawings.

BRIEF DESCRIPTION OF THE DRAWINGS

The invention is further explained by the following exemplary descriptions of particular embodiments.

DETAILED DESCRIPTION OF THE VARIOUS EMBODIMENTS

Figure 1:
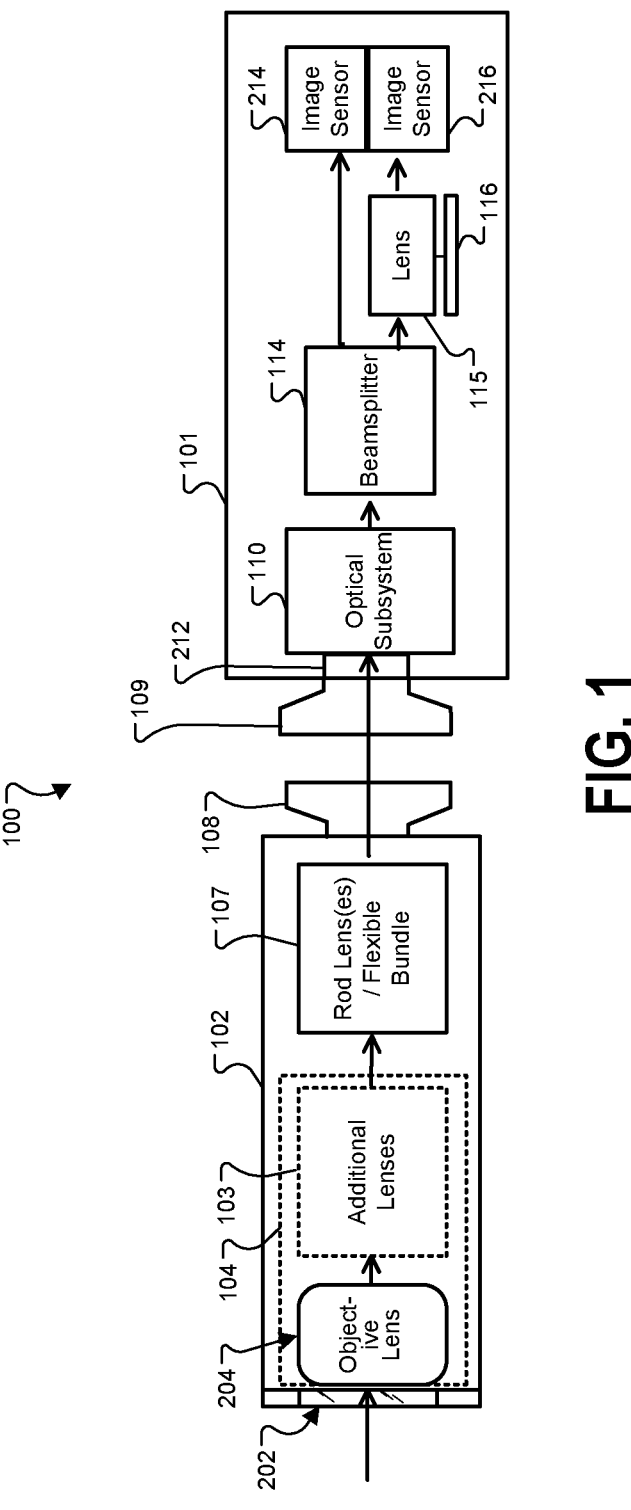
FIG. 1 is a block diagram of a medical imaging device 100 according to an example embodiment of the invention.

FIG. 1 is a block diagram of a medical imaging device 100 according to an example embodiment of the invention. Medical imaging device 100 ("device 100") includes a camera head 101 which may have an endoscope 102 attached via connectors 108 and 109. In some embodiments, an endoscope 102 and camera head 101 may be integrated into a single housing with no connectors needed. Connectors 108 and 109 in this embodiment constitute what is generally called a "claw coupling" or dock-clutch coupling, comprising a clutch that couples two components, whereby at least one or both components are rotatable. Preferably, the claw (109) of the claw coupling is designed such that the eyepiece cup (108) is pushed towards the interface portion to engage the connection. Connectors 108 and 109 may be any suitable connector allowing light to pass from endoscope 102 to camera head 101. Various structural components supporting the depicted elements are omitted in the diagrams herein, as well as other components such as illumination light sources and controls, which are known in the art and are not shown in order to avoid obscuring the relevant details of the example embodiments of the invention.

Camera head 101 includes an optical subsystem 110 that transmits light for a white light image or other non-fluorescent image, and transmits light for an image created from fluorescence in an illuminated scene. Optical subsystem 110 positioned at or behind a central window of connector 212 to receive and condition optical image light from the endoscope 102. Optical subsystem 110 typically includes a number of lenses for focusing both white light and fluorescence light, as further described below. Many suitable lenses and combinations of lenses may be used for optical subsystem 110.

A beamsplitter 114 is positioned downstream from the first optical subsystem and separates the light for said non-fluorescent image into a first imaging channel and light for said fluorescence image into a second imaging channel. In this embodiment, the first imaging channel follows an optical path directed at an image sensor 214, and the second imaging channel follows an optical path directed at an image sensor 216. In other embodiments the two imaging channels may be directed at separate areas of a single image sensor. The sensor signal, containing two images, is processed as further described with respect to FIG. 6 and FIG. 8 to provide a combined image.

A meniscus lens 115 is positioned downstream from the beamsplitter in the second imaging channel and functions to change the magnification of the second imaging channel with respect to the first imaging channel. In this embodiment, a movement mechanism 116 is mechanically attached to meniscus lens 115 for moving the lens along the second imaging channel to adjust the focus of the second imaging channel. The focus adjustment does not alter the magnification change performed by the lens, making the focus independent of the magnification level, as will be further discussed with relation FIGS. 7 and 8 regarding the optical design of the meniscus lens 115.

In some embodiments, system 100 includes an endoscope 102 as depicted at the left of the block diagram. The depicted endoscope is an example only, and many endoscope designs are suitable, including rigid and flexible endoscopes. Endoscope 102 includes a cover glass 202 at its distal tip, which in this version faces directly along the longitudinal axis of the endoscope 102, but may also be positioned at an angle relative to the longitudinal axis as is known in the art. Behind, or on the proximal side of, cover glass 202 is shown a preferred position for the objective lens 204, set against or very near cover glass 202 and preferably assembled together with the cover glass in construction. While a wide-angle lens is preferred for objective lens 204, this is not limiting and any suitable lens may be used in various embodiments. Objective lens 204 may be part of an objective lens group 104 which may include one or more additional lenses 103. The particular number and arrangement of lenses in the endoscope 102 will vary widely depending on the application. Optically arranged or attached at the proximal side of objective lens 204 or objective lens group 104 is flexible fiber bundle or a series of one or more rod lens pairs 107, which serve to pass the light down endoscope 102 in the proximal direction. For embodiments with a flexible shaft, the flexible fiber bundle is used. For rigid or semi-rigid shafts, one or several rod lens pairs 107 are employed, which may be separated by spacers or other lenses in any suitable manner known in the art. For embodiments with a semi-rigid shaft, flexible joints are present in one or more places along the shaft between the rod lenses, while the shaft is rigid along the portions containing a rod lens.

Figure 2:
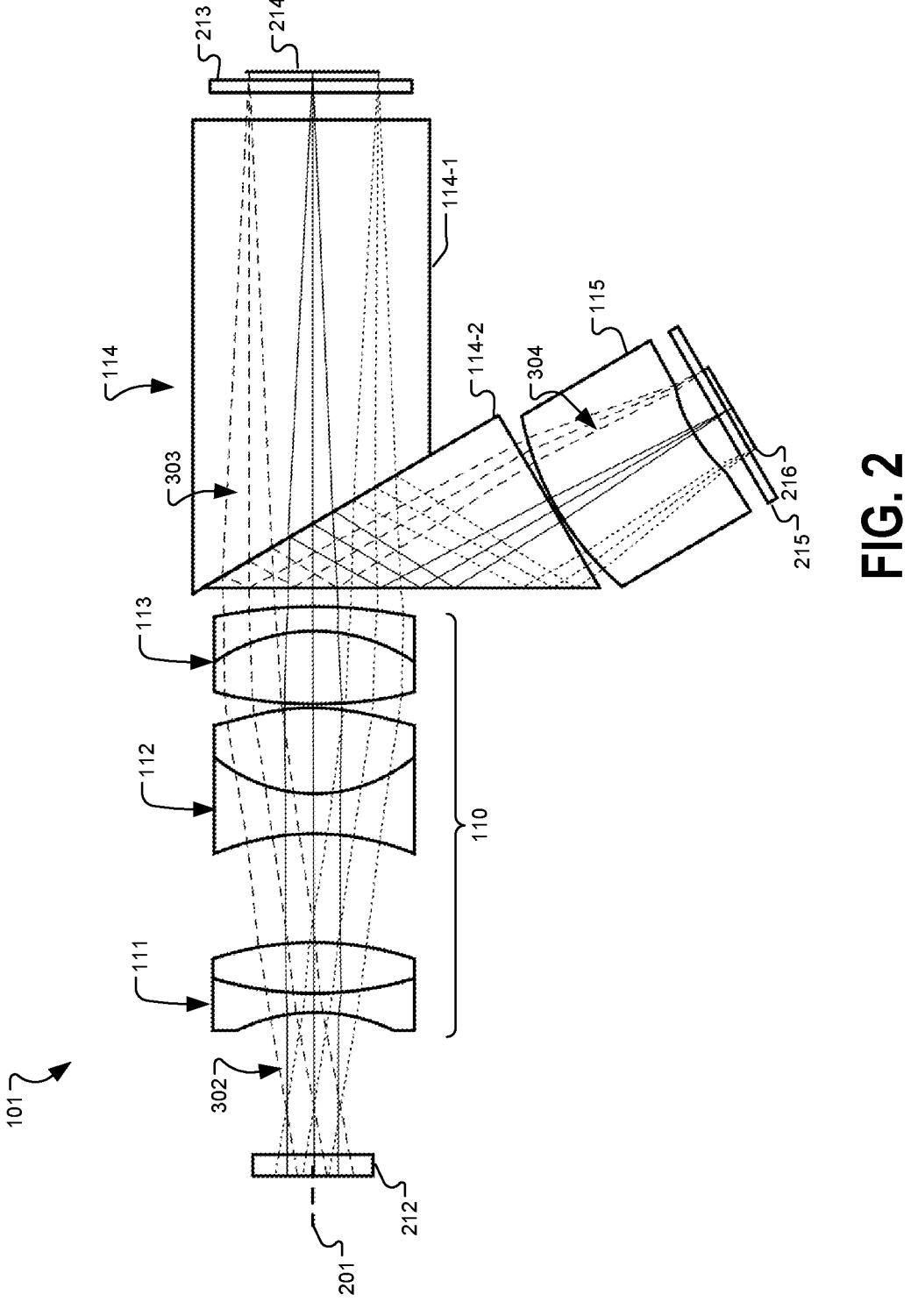
FIG. 2 is a partial cross section diagram of a camera head 101 showing the optical assembly construction according to an example embodiment.

FIG. 2 is a partial cross section diagram of a camera head 101 showing the optical assembly construction according to an example embodiment. The cross section includes a light ray diagram showing image light 302 passing through the assembly along a central optical axis 201, and then being directed by a beamsplitter 114 toward two separate image sensors 214 and 216. The depicted optical elements are in diagram form only and are not drawn to scale. The depicted optical assembly may be employed with endoscope devices and systems having an integrated camera or an external detachable camera head.

As shown, image light 302 enters the optical assembly at a cover glass 212 in this embodiment. Image light 302 then passes downstream to optical subsystem 110, which in this embodiment includes a lens pair 111, a lens pair 112, and a lens pair 113. Lens pair 111 includes a bi-concave lens followed by a bi-convex lens, which together have a slightly positive or negative power. Lens pair 112 includes a bi-concave lens followed by a biconvex lens, having total positive power. Lens pair 113 includes a bi-convex lens and a concave-convex lens, which together have a positive power and serve to focus image light 302. These three lens pairs are designed to focus and align image light 302 along the central optical axis toward beamsplitter 114. Various other lens combinations may be used to achieve the same result in various embodiments.

In this embodiment, beamsplitter 114 is constructed of two prisms 114-1 and 114-2, with a suitable dichroic beam-splitting layer formed of a partially reflective coating along their adjacent surface, by which the image light is split with a first portion passing through along first optical path illustrated by image light 303 and a second portion reflected downward along second optical path illustrated by imaging light 304. In this embodiment, the partially reflective coating reflects fluorescence light of a desired wavelength band. An internal reflective surface is provided at the left depicted edge of prism 114-2 to reflect the image light as depicted. As discussed above, the first and second portions of light include different spectral content, with white light passed along optical path 303 and fluorescence light passed along optical path 304. A dichroic beam splitting layer is arranged at the interface between the prism two prisms 114-1 and 114-2. Other suitable layers such as filtering layers may also be included in the prisms. For example, a white light filtering layer may be provided at the proximal surface of prism 114-2, where image light 304 leaves prism 114-2, and a fluorescence light filtering surface may be included at the proximal surface of prism 114-1 where image light 303 leaves prism 114-1.

In this embodiment, a meniscus lens 115 is positioned downstream from the beamsplitter in the second imaging channel along the path of image light 304 and centered along the 60-degree angle of the prism. Meniscus lens 115 functions reduce the magnification of the second imaging channel with respect to the first imaging channel. Meniscus lens may be constructed as described below with respect to FIG. 7 and FIG. 8.

First image sensor 214 is positioned downstream of a cover glass or protective layer 213, with the image sensor positioned perpendicularly to the longitudinal axis of camera head 101, while second image sensor 216 is positioned downstream of a cover glass or protective layer 215, with the image sensor directed at a relative 60 degree angle to the longitudinal axis.

As described above, a movement mechanism may be included to move meniscus lens 115 along the second imaging channel to adjust the focus of the second imaging channel. Such focus adjustment does not alter the magnification change performed by the lens 115, making the focus independent of the magnification level. A focal adjustment may be made to either imaging channels by moving the respective image sensor along the respective optical path as well, using a mechanical adjustment mechanism. A meniscus lens arranged as depicted allows the imaging device to increase the SNR (signal to noise ratio) of the fluorescence image by effectively concentrating the image intensity onto a smaller area of the image sensor and provide for independent focusing of the white light channel and the fluorescence channel. Due to the demagnification of meniscus lens 115, a reduced image size of the image captured by the second image sensor 216 is enabled, increasing the intensity of the image relative to image size on second image sensor 216 for fluorescence light, thus improving the sensitivity of the image sensor 216 for the resulting fluorescence image by increasing the signal-to-noise ratio within the image area. Simultaneously, the demagnification provided by meniscus lens 115 may serve to inhibit aberrations in images captured by the second image sensor 216.

Figure 3:
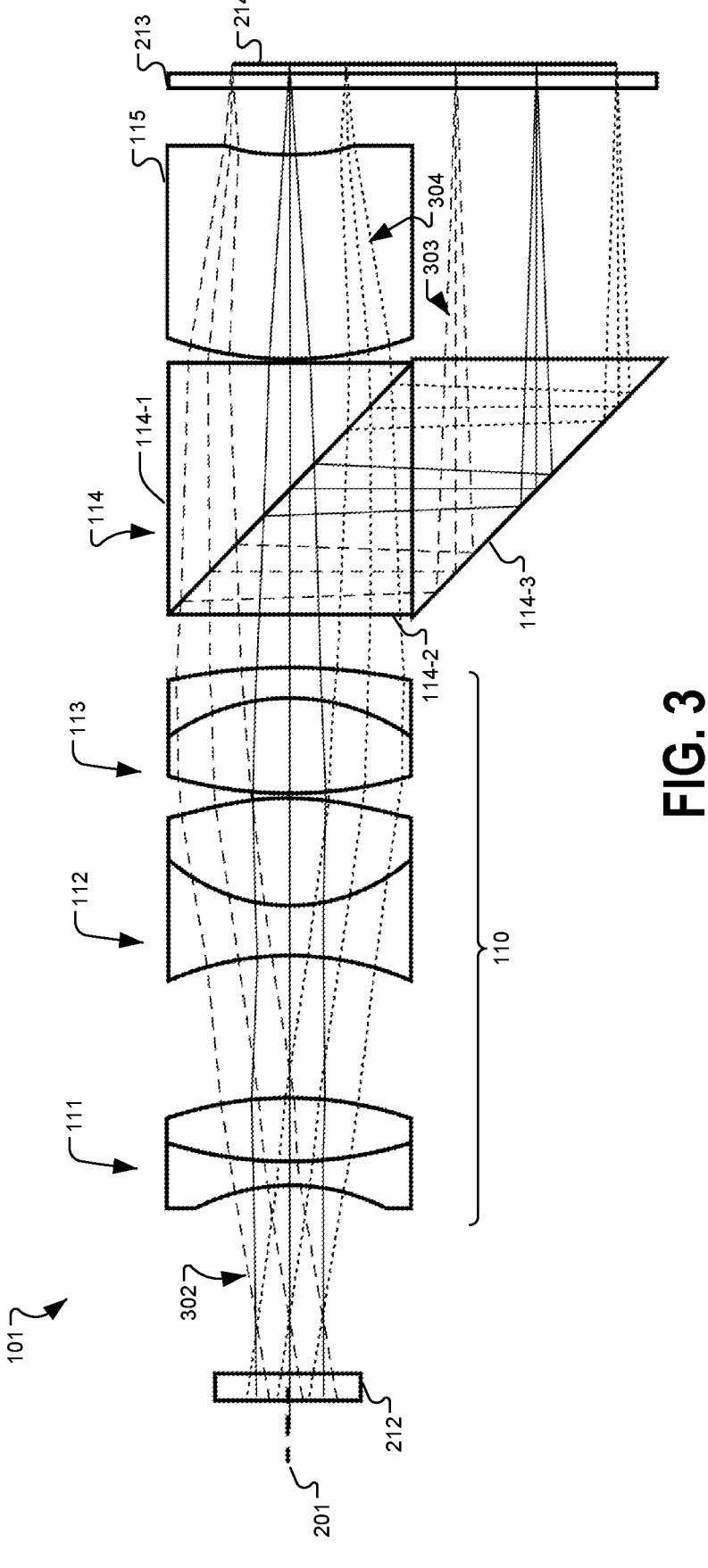
FIG. 3 is a partial cross section diagram of a camera head 101 showing the optical assembly construction according to another example embodiment using a single image sensor.

FIG. 3 is a partial cross section diagram of a camera head 101 showing the optical assembly construction according to another example embodiment wherein a single image sensor is used to capture both the white light and FI images. The cross section includes a light ray diagram showing image light 302 passing through the assembly along a central optical axis 201, and then being directed by a beamsplitter 114 toward a single image sensor 214. The depicted optical elements are in diagram form only and are not drawn to scale. The depicted optical assembly may be employed with endoscope devices and systems having an integrated camera or an external detachable camera head.

As shown, image light 302 enters the optical assembly at a cover glass 212 in this embodiment. Image light 302 then passes downstream to optical subsystem 110, which in this embodiment includes a lens pair 111, a lens pair 112, and a lens pair 113. Optical subsystem 110 is constructed as described above with respect to FIG. 2.

In this embodiment, beamsplitter 114 is constructed of three right angle prisms 114-1, 114-2, and 114-3, with a suitable dichroic beam splitting layer formed of a partially reflective coating along the adjacent interface of prisms 114-1 and 114-2. The image light is split with a first portion reflected along first optical path illustrated by image light 303 and a second portion passing along the second optical path illustrated by imaging light 304. In this embodiment, the partially reflective coating reflects the white light spectral band. An internal reflective surface is provided at the left depicted edge of prism 114-3 to reflect the image light within the prism 114-3 as depicted. As discussed above, the first and second portions of light include different spectral content, with white light passed along optical path 303 and fluorescence light passed along optical path 304. Other suitable layers such as filtering layers may also be included in the prisms. For example, a fluorescence light filtering layer may be provided at the proximal surface of prism 114-2, or at the proximal surface of prism 114-3, and a white light filtering surface may be included at the proximal surface of prism 114-1.

In this embodiment, a meniscus lens 115 is positioned downstream from the beamsplitter in the second imaging channel along the path of image light 304 and centered along the main optical axis 201. Meniscus lens 115 functions reduce the magnification of the second imaging channel with respect to the first imaging channel. Meniscus lens may be constructed as described below with respect to FIG. 7 and FIG. 8.

Image sensor 214 is positioned downstream of a cover glass or protective layer 213, with the image sensor placed perpendicularly to the longitudinal axis of camera head 101, and positioned at an offset from the axis 201 to allow image light 303 and image light 304 to be detected on two separate areas of image sensor 214, with image light 304 detected in an area centered along the main optical axis 201, and image light 303 detected in an area offset from the main axis along the first optical path. It should be noted that while image sensor 214 in preferred embodiments is a single image sensor, in other embodiments two sensors may be employed in order to take advantage of both sensors being located in a common plane, and thus simplifying manufacturing geometry, including the ability for both sensors to be mounted onto a single circuit board.

As described above, a movement mechanism may be included to move meniscus lens 115 along the second imaging channel to adjust the focus of the second imaging channel. Such focus adjustment does not alter the magnification change performed by the lens, making the focus independent of the magnification level. A meniscus lens arranged as depicted allows the imaging device to increase the SNR (signal to noise ratio) of the fluorescence image and provide for independent focusing of the white light channel and the fluorescence channel. The demagnification caused by meniscus lens 115 provides a reduced image size of the image captured by the image sensor 214, thereby increasing the intensity of the image relative to image size on image sensor 214 for the FI channel. The signal-to-noise ratio of the region of image sensor 214 dedicated to the fluorescent image is thereby increased. Simultaneously, the demagnification provided by meniscus lens 115 may service to inhibit aberrations in images captured by the image sensor 214.

Figure 4:
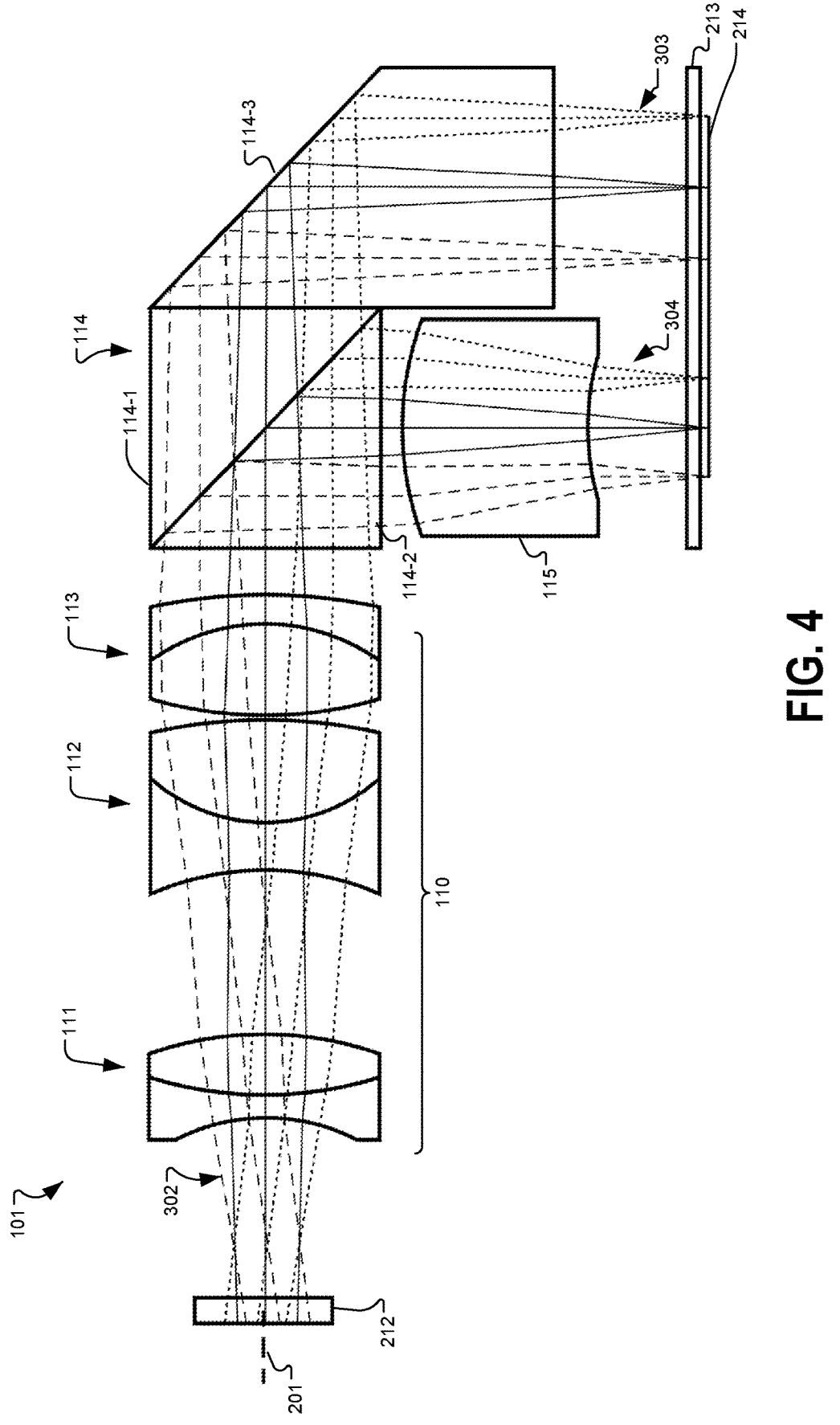
FIG. 4 is a partial cross section diagram of a camera head 101 showing the optical assembly construction according to another example embodiment using a single image sensor directed at a right angle to the main optical axis.

FIG. 4 is a partial cross section diagram of a camera head 101 showing the optical assembly construction according to another example embodiment using a single image sensor directed at a right angle to the main optical axis. The cross section includes a light ray diagram showing image light 302 passing through the assembly along a central optical axis 201, and then being directed by a beamsplitter 114 toward a single image sensor 214. The depicted optical elements are in diagram form only and are not drawn to scale. The depicted optical assembly may be employed with endoscope devices and systems having an integrated camera or an external detachable camera head.

Image light 302 enters the optical assembly at a cover glass 212 in this embodiment. Image light 302 then passes downstream to optical subsystem 110, which in this embodiment includes a lens pair 111, a lens pair 112, and a lens pair 113. Optical subsystem 110 is constructed as described above with respect to FIG. 2.

In this embodiment, beamsplitter 114 is constructed of three right angle prisms 114-1, 114-2, and 114-3, with a suitable dichroic beam splitting layer formed of a partially reflective coating along the adjacent interface of prisms 114-1 and 114-2. The image light is split with a first portion passing along first optical path illustrated by image light 303 and a second portion reflected along the second optical path illustrated by imaging light 304. An internal reflective surface is provided at the right depicted edge of prism 114-3 to reflect the first image light as depicted. As discussed above, the first and second portions of light include different spectral content, with white light passed along optical path 303 and fluorescence light passed along optical path 304. Other suitable layers such as filtering layers may also be included in the prisms. For example, a white light filtering layer may be provided at the proximal surface of prism 114-2, where image light 304 leaves prism 114-2, and a fluorescence light filtering surface may be included at the proximal surface of prism 114-1 where image light 303 leaves prism 114-1, or at the proximal surface of prism 114-3.

In this embodiment, a meniscus lens 115 is positioned downstream from the beamsplitter in the second imaging channel along the path of image light 304. Meniscus lens 115 functions reduce the magnification of the second imaging channel with respect to the first imaging channel. Meniscus lens may be constructed as described below with respect to FIG. 7 and FIG. 8.

Image sensor 214 is positioned downstream of a cover glass or protective layer 213, with the image sensor positioned parallel the longitudinal axis of camera head 101.

As described above, a movement mechanism may be included to move meniscus lens 115 along the second imaging channel to adjust the focus of the second imaging channel. Such focus adjustment does not alter the magnification change performed by the lens, making the focus independent of the magnification level. The demagnification of meniscus lens 115, as described above, improves the sensitivity of the image on sensor 214 for the resulting fluorescence image by increasing the signal-to-noise ratio, and allows for chromatic aberrations to be corrected in the second imaging channel.

Figure 5:
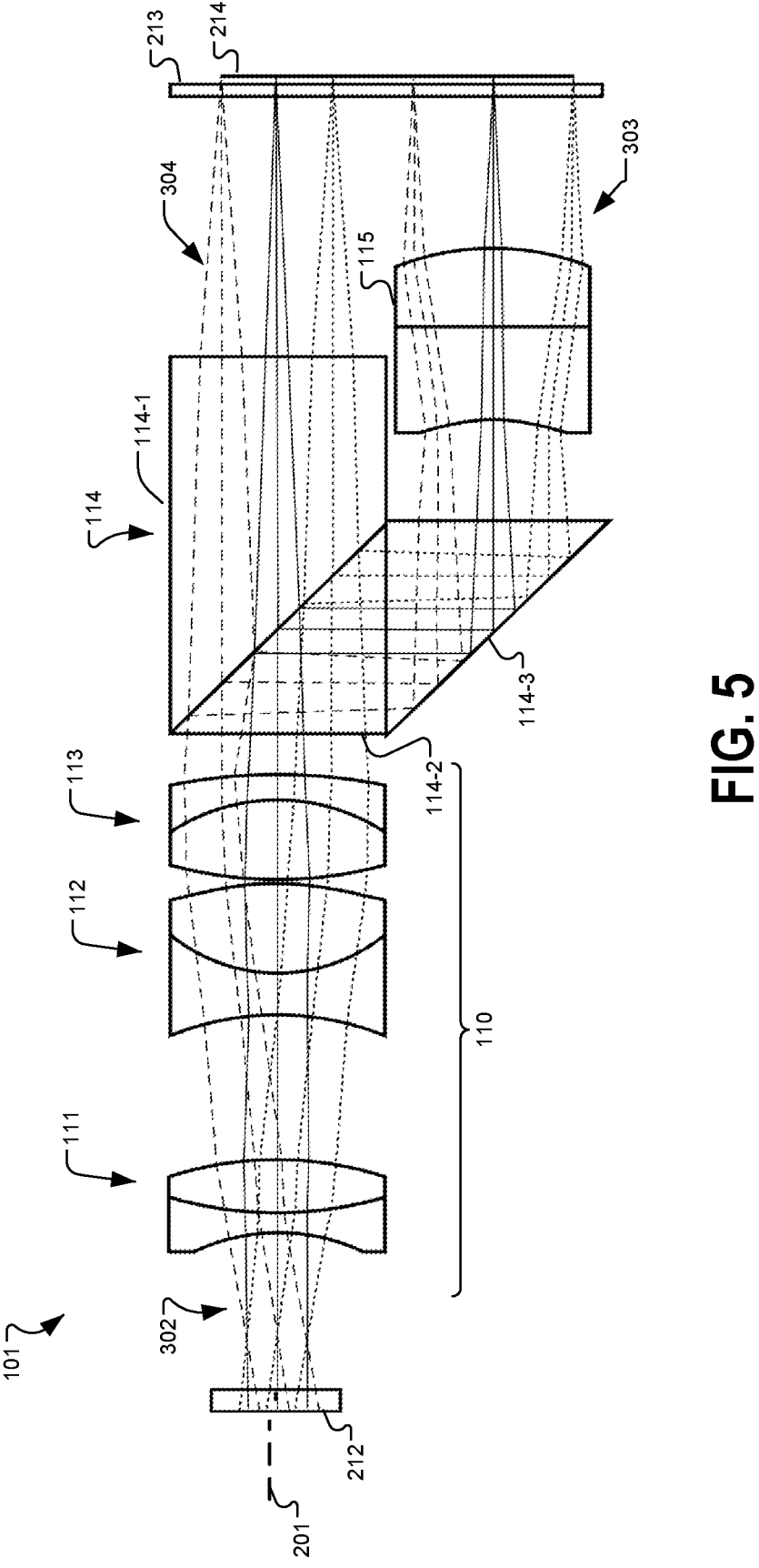
FIG. 5 is a partial cross section diagram of a camera head 101 showing the optical assembly construction according to another example embodiment using a single image sensor with magnification provided in the imaging channel for white light.

FIG. 5 is a partial cross section diagram of a camera head 101 showing the optical assembly construction according to another example embodiment using a single image sensor with magnification provided in the imaging channel for white light. The cross section includes a light ray diagram showing image light 302 passing through the assembly along a central optical axis 201, and then being directed by a beamsplitter 114 toward a single image sensor 214. The depicted optical elements are in diagram form only and are not drawn to scale. The depicted optical assembly may be employed with endoscope devices and systems having an integrated camera or an external detachable camera head.

As shown, image light 302 enters the optical assembly at a cover glass 212 in this embodiment. Image light 302 then passes downstream to optical subsystem 110, which in this embodiment includes a lens pair 111, a lens pair 112, and a lens pair 113. Optical subsystem 110 is constructed as described above with respect to FIG. 2.

In this embodiment, beamsplitter 114 is constructed of three right angle prisms 114-1, 114-2, and 114-3, with a suitable dichroic beam splitting layer formed of a partially reflective coating along the adjacent interface of prisms 114-1 and 114-2. The image light is split with a first portion reflected along first optical path illustrated by image light 303 and a second portion passing along the second optical path illustrated by imaging light 304. An internal reflective surface is provided at the left depicted edge of prism 114-3 to reflect the image light as depicted. As discussed above, the first and second portions of light include different spectral content, with white light passed along optical path 303 and fluorescence light passed along optical path 304. Other suitable layers such as filtering layers may also be included in the prisms. For example, a white light filtering layer may be provided at the proximal surface of prism 114-1, where image light 304 leaves prism 114-1, and a fluorescence light filtering surface may be included at the proximal surface of prism 114-2 where image light 303 leaves prism 114-2 and enters prism 114-3, or may be included at the proximal surface of prism 114-3, where light 303 leaves prism 114-3.

In this embodiment, a meniscus lens 115 is positioned downstream from the beamsplitter in the first imaging channel along the path of image light 303. Meniscus lens 115 functions to increase the magnification of the first imaging channel with respect to the second imaging channel. The orientation of meniscus lens is therefore reversed from the embodiments described above.

Image sensor 214 is positioned downstream of a cover glass or protective layer 213, with the image sensor positioned perpendicular to the longitudinal axis of camera head 101, and positioned at an offset from the axis 201 to allow image light 303 and image light 304 to be detected on two separate areas of image sensor 214, with image light 304 detected in an area centered along the main optical axis 201, and image light 303 detected in an area offset from the main axis along the first optical path.

As described above, a movement mechanism may be included to move meniscus lens 115 along the second imaging channel to adjust the focus of the second imaging channel. Such focus adjustment does not alter the magnification change performed by the lens, making the focus independent of the magnification level. A meniscus lens arranged as depicted allows the imaging device to magnify the white light image relative to that of the FI channel, thereby increasing the resolution of the captured white light image by spreading the image over a larger area (and therefore a greater number of pixels) of the image sensor 214. This configuration is particularly useful in very narrow diameter endoscopes. As the amount of light captured from a scene is limited, and the FI image carries much less intensity than the white light image, the FI channel image can remain unchanged, and the much brighter white light image can be expanded to fill more of the image sensor, thus improving the resolution of the white light image while simultaneously favorably lessening the brightness per unit area of image sensor to more closely match the brightness of the FI image. Simultaneously, the magnification provided by meniscus lens 115 may serve to inhibit aberrations in images captured by the image sensor 214. In some embodiments where the meniscus lens 115 is placed within the white light channel, it is a doublet in order to avoid potentially introducing chromatic aberration in the captured white light image. By contrast, when the meniscus lens 115 is placed within the FI channel, such as presented in FIG. 4, the narrow spectral band of the fluorescence light is unlikely to be negatively affected by chromatic aberration.

Figure 6:
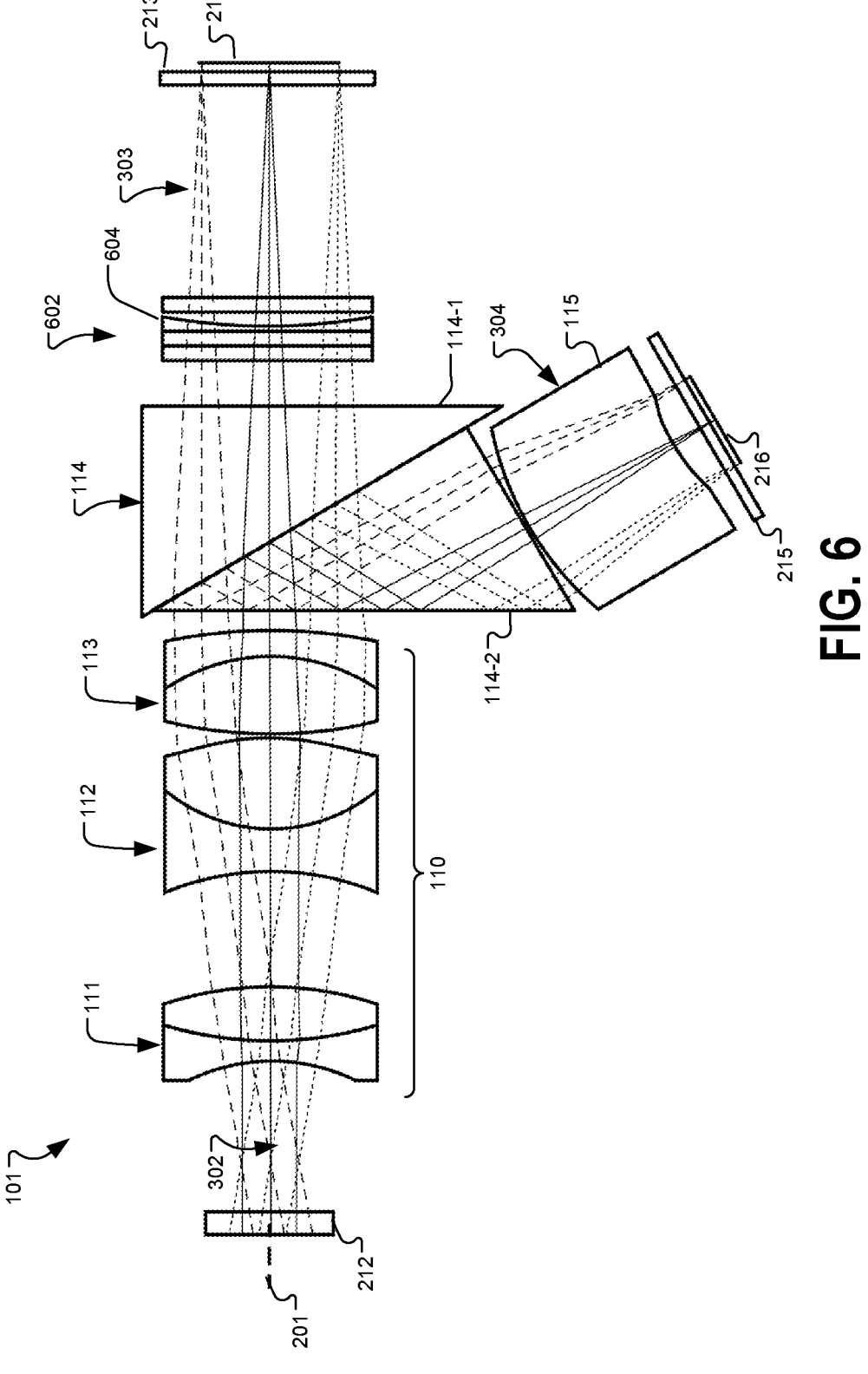
FIG. 6 is a partial cross section diagram of a camera head 101 showing the optical assembly construction according to an example embodiment employing a liquid lens 602 for focal adjustments in one channel.

FIG. 6 is a partial cross section diagram of a camera head 101 showing the optical assembly construction according to an example embodiment employing a liquid lens 602 for focal adjustments in one channel. The depicted optical assembly is constructed like that of FIG. 2, with the addition of a deformable liquid lens 602 for adjusting the focus of the first optical channel.

Deformable liquid lens 602 includes a liquid lens layer 604 composed of an optical liquid material that can change its shape. Liquid lenses are known in the art and include a focal length alterable by changing the radius of curvature of the lens. This change in radius is electronically controlled and is able to be rapidly altered on the order of milliseconds. Various implementations may employ electrowetting, shape-changing polymers, or acoustic-optical tuning methods to control the liquid lens's radius of curvature or refractive index. In this embodiment, deformable liquid lens 602 is present in the first optical channel and employed to adjust the focus of image light 303. However, in other embodiments deformable liquid lens 602 may be present in the second optical channel and employed to adjust the focus of second image light 304. When a deformable liquid lens 602 is used in either, a mechanical position adjustment mechanism for meniscus lens 115 may be obviated.

The various embodiments described above may be used to perform FI with various fluorescent light wavelengths. For example, fluorophores such as indocyanine green (ICG) or fluorescent imaging ligand ("OTL38" or "OTL") may be present in the scene and be exposed to corresponding excitation wavelengths, resulting in emitted light in specific wavelength bands. These fluorophores may both be detected in a wavelength band of approximately 800-850 nm. By approximately it is meant that for a particular application the boundaries of the band are not generally sharp and tend to have longish tails, which makes precise wavelength band not completely defined and thus the boundaries of the band may vary by much as 10 nm. For example, OTL fluoresces (that is, emits fluorescence radiation) at about 790 to 800 nm, while ICG fluoresces at 800-810 nm. For these applications, a beamsplitter is provided that splits off a band of approximately 800-850 nm from the image light, by selectively reflecting or passing this band. In another example, Cy5 (Cyanine 5) and Cy5.5 (Cyanine 5.5) fluorescent dies typically emit fluorescence in the range of approximately 650-670 nm and 675-695 nm, respectively. A suitable implementation of beamsplitter 114 may be designed to split off wavelengths approximately 650-725 nm to select this band, again by selectively reflecting these wavelengths or selectively passing them. As another example, Fluorescein typically emits fluorescence in the range of approximately 515-545 nm. A suitable implementation of beamsplitter 114 splits off a band having wavelengths approximately 500-550 nm by selectively passing or reflecting them.

Figures 7, 8:
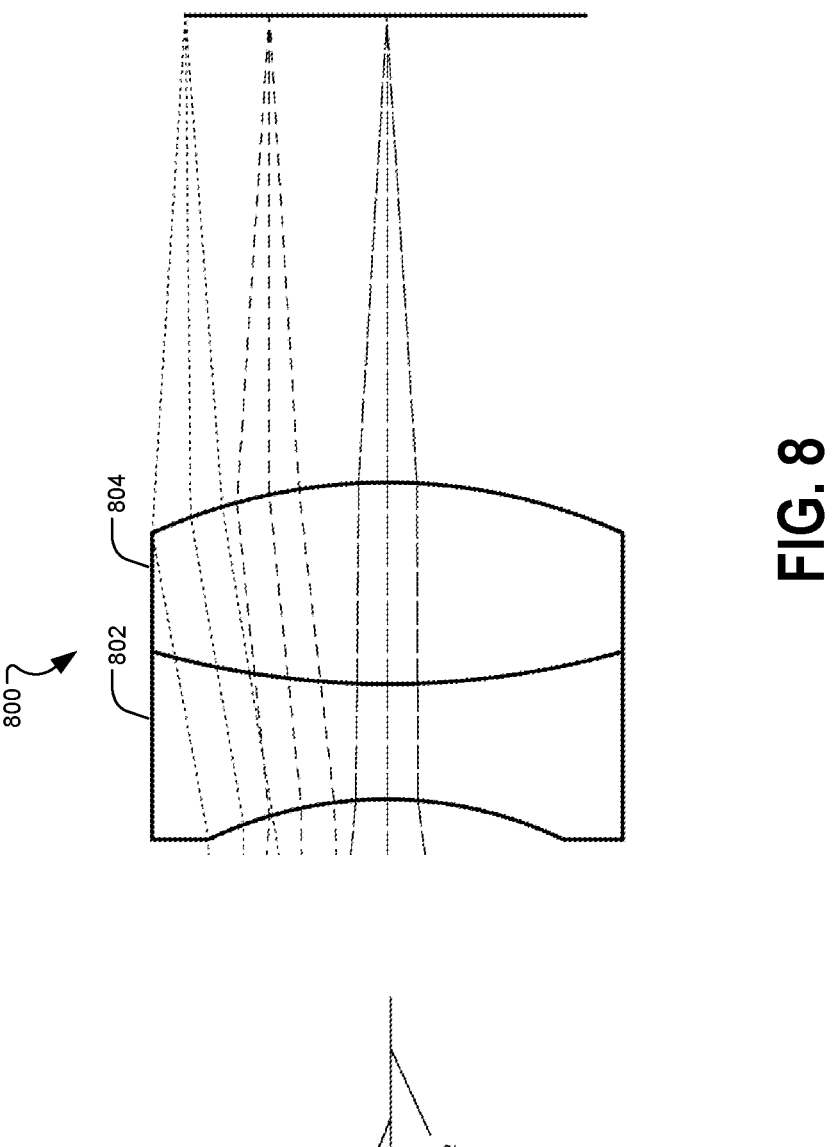
FIG. 7 shows a cross-section diagram of a meniscus lens 700 according to an example embodiment.
FIG. 8 shows a cross-section diagram of a meniscus lens 800 according to another example embodiment.

FIG. 7 shows a cross-section diagram of a meniscus lens 700. Meniscus lens 700 is an afocal meniscus lens suitable for use in all of the embodiments described herein, as indicated as meniscus lens 115 in FIGS. 2-6 and other envisioned embodiments. Meniscus lens 700 in this implementation is constructed as a singlet having thickness "t", an index of refraction "n", a larger radius of curvature "$r_1$" and a smaller radius of curvature "$r_2$". Generally, the afocal properties of a meniscus lens result by the lens having the relationship described in equation 1:

$$t = \frac{n}{n-1}(r_1 - r_2). \tag{1}$$

The magnification "m" of afocal meniscus lens 700 is then equal to $r_2/r_1$. As described above, the orientation of the lens is reversed with the larger radius on the distal side to provide demagnification rather than magnification (see FIG. 8). Properties of afocal meniscus lenses when used in converging light near an image plane (i.e., sensor plane) as described herein provide several advantages. If the input beam is telecentric, the output beam will be as well. The meniscus lens introduces reasonably small amounts of (monochromatic) aberrations if used at moderate magnification. The magnification is constant with focus so that the camera control unit is not required to determine what the actual magnification is every time the unit is focused, as may be required with other focus adjustment schemes. This focusing benefit is particularly beneficial in embodiments employing only a single image sensor, because it is not possible to change the position of the white light sensor independent of the fluorescence sensor. The lens 700 may also provide aberration correction, particularly for chromatic aberrations in white light.

FIG. 8 shows a cross-section diagram of a meniscus lens 800 according to another example embodiment and may serve as meniscus lens 115 in FIGS. 2-6 and other envisioned embodiments. Meniscus lens 800 is an afocal meniscus lens constructed as a doublet including a bi-convex lens 804 and a biconcave lens 802. Lens 804 provides the outer surface with larger radius r1 as described above, while lens 802 provides the smaller radius r2 at its outer surface. Lens 800 has an overall magnifying affect. This doublet construction is helpful for reducing chromatic aberrations, especially when employed in the white light imaging channel as described above, for example, with respect to FIG. 5.

Table 1 below provides several example parameter values that may be employed to construct an afocal meniscus lens suitable for use with various embodiments. Dimensions are given in millimeters.

TABLE 1

| Example Values | | | | |
|---|---|---|---|---|
| r1 | r2 | t | n | m |
| 14.000 | 10.717 | 7 | 1.883 | 0.77 |
| 14.500 | 9.500 | 10 | 2.001 | 0.66 |
| 12.000 | 9.956 | 6 | 1.517 | 0.83 |
| 18.000 | 15.776 | 6 | 1.589 | 0.88 |
| 9.000 | 4.998 | 8 | 2.001 | 0.56 |

Figure 9:
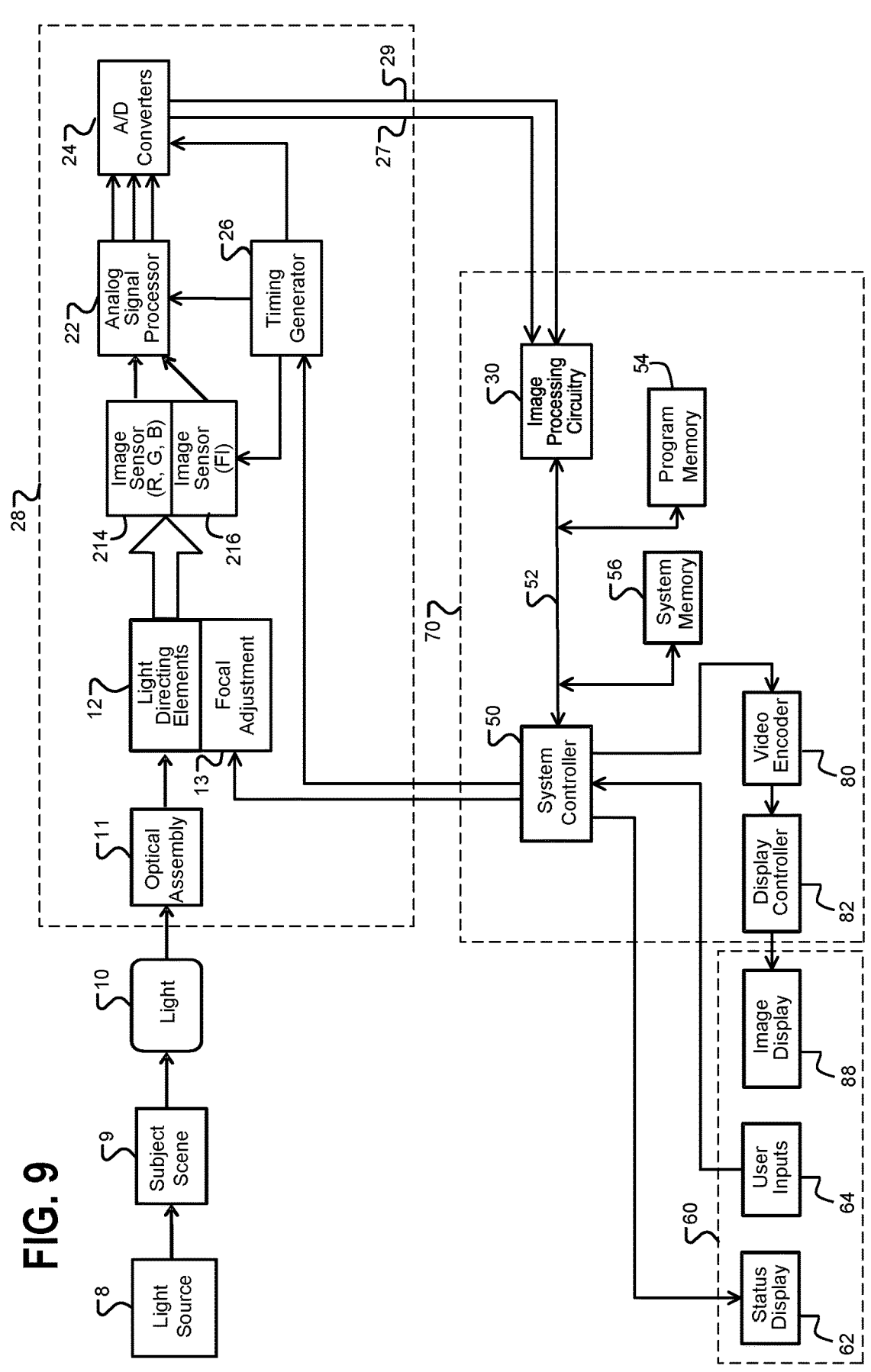
FIG. 9 is a hardware block diagram of system including an example image capture device according to an example embodiment of the invention.

FIG. 9 is a block diagram of an optical instrument system according to an example embodiment of the present invention. The depicted design is suitable for implementing the various embodiments described above, as well as other embodiments. While this example circuit is shown for an endoscope, the present invention is applicable to other instruments such as borescopes, or exoscopes, for example.

A light source 8 illuminates subject scene 9 and light 10 reflected or scattered from (or, alternatively, as in the case of FI, emitted by) the subject scene forms an optical image via an optical channel assembly 11, where the light passed to the camera head, typically using a relay system comprising rod lenses. At the camera head the light is focused, aligned with the scope axis or a desired optical axis, and passed to a distal side of optical channel assembly 11 where light directing elements 12, such as beamsplitter 114 described above, direct different spectral portions of the light to form different portions of the image on first and second solid-state image sensors 214 and 216. A focal adjustment mechanism may be included to allow control of focus mechanisms, such as the position adjustment mechanism described above for meniscus lenses 115 or the adjustable liquid lens 602, as well as focal elements for adjusting the focus of the overall system (e.g., both channels together), such as lenses within optical group 110, upstream from the beamsplitter 114. While two image sensors are shown in this implementation, single-sensor designs such as those described herein may be implemented by removing the second image sensor 216 when the light directing elements 12 direct both portions of light to distinct regions of the single image sensor.

In this embodiment, optical channel assembly 11 includes an imaging system and may be constructed according to a variety of known methods. Image sensors 214 and 216 convert the incident light to an electrical signal by, for example, integrating charge for each picture element (pixel). The image sensors 214 and 216 may be active-pixel type complementary metal oxide semiconductor sensors (CMOS APS) or a charge-coupled devices (CCD), to give just two possible examples. The output analog signal from the image sensors is processed by analog signal processor 22 and applied to analog-to-digital (A/D) converter 24 for digitizing the analog sensor signals. In some versions (typically CMOS designs), the analog signal processing and A/D converters may be integrated into individual sensor models attached to each sensor 214 and 216.

The system's camera 28 generally includes timing generator 26, which produces various clocking signals to select rows and pixels and synchronizes the operation of image sensors 214 and 216, analog signal processor 22, and A/D converter 24. A camera head electronic assembly typically houses image sensors 214 and 216, while the locations of each of analog signal processor 22, the A/D converter 24, and the timing generator 26 may vary, for example in the scope handle 102. The non-optical, functional elements of the camera 28 may be fabricated as a single integrated circuit as is commonly done with CMOS image sensors or they may be separately-fabricated integrated circuits.

The system controller 50 controls the overall operation of the image capture device based on a software program stored in program memory 54. This memory can also be used to store user setting selections and other data to be preserved when the camera 28 is turned off. Data connections 27 and 29 carry the digital image data of image sensors 214 and 216, respectively, to image processing circuitry 30, which may be integrated with system controller 50 in some versions or may be a separate programmable logic device or data processor. A data bus 52 provides a pathway for address, data, and control signals. Control signals are sent to focal/magnification adjustment mechanism 13 and timing generator 26. In some variations, data bus 52 may also carry data connections 27 and 29.

Image processing circuitry 30 performs image processing operations including the operations to rescale the demagnified FI image (or the magnified white light image) such that the two images are at or near the same size to combine the two images from image sensors 214 and 216 as desired, including, in some embodiments, processing sub-images based on the first and second portions of light for embodiments with a single image sensor. Image processing circuitry 30 and system controller 50 may perform autofocus algorithms to make focal adjustments based either white light imaging or fluorescence imaging.

Processed image data are continuously sent to video encoder 80 to produce a video signal. This signal is processed by display controller 82 and presented on image display 88. This display is typically an HD, UHD, or 4K format liquid crystal display backlit with light-emitting diodes (LED LCD), although other types of displays may be used as well. The processed image data can also be stored in system memory 56 or other internal or external memory device.

The user interface 60, including all or any combination of image display 88, user inputs 64, and status display 62, is controlled by a combination of software programs executed on system controller 50. User inputs typically include some combination of typing keyboards, computer pointing devices, buttons, rocker switches, joysticks, rotary dials, or touch screens. The system controller 50 may manage the graphical user interface (GUI) presented on one or more of the displays (e.g. on image display 88). The GUI typically includes menus for making various option selections.

Image processing circuitry 30, system controller 50, system and program memories 56 and 54, video encoder 80, and display controller 82 may be housed within camera control unit (CCU) 70. CCU 70 may be responsible for powering and controlling light source 8 and/or camera 28. As used herein "CCU" refers to units or modules that power, receive data from, manipulate data from, transmit data to, and/or forwards data from optical instrument cameras. CCU functionalities may be spread over multiple units known as, for example, a "connect module", "link module", or "head module".

As used herein the terms "comprising," "including," "carrying," "having" "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The foregoing has outlined rather broadly the features and technical advantages of the invention in order that the detailed description of the invention that follows may be better understood. It should be appreciated by those skilled in the art that the conception and specific embodiments disclosed may be readily utilized as a basis for modifying or designing other structures for carrying out the same purposes of the invention. It should also be realized by those skilled in the art that such equivalent constructions do not depart from the scope of the invention as set forth in the appended claims.

Although the invention and its advantages have been described in detail, it should be understood that various changes, substitutions and alterations can be made herein without departing from the scope of the invention as defined by the appended claims. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the invention, processes, machines, manufacture, compositions of matter, means, methods, or steps, presently existing or later to be developed that perform substantially the same function or achieve substantially the same result as the corresponding embodiments described herein may be utilized according to the invention. Accordingly, the appended claims are intended to include within their scope such processes, machines, manufacture, compositions of matter, means, methods, or steps.

The invention claimed is:

1. A video camera device for white light and fluorescence imaging comprising:
   a first optical subsystem that transmits reflected and scattered light for a non-fluorescent image and transmits emitted fluorescence light for a fluorescence image, both fluorescence and non-fluorescence light collected from an illuminated scene;
   a beamsplitter downstream from the first optical subsystem which separates the light for said non-fluorescence image into a first imaging channel for and light for said fluorescence image into a second imaging channel;
   a meniscus lens positioned downstream from the beamsplitter in one of the first and second imaging channels, the meniscus lens functional to change a magnification such that a magnification of the first imaging channel is different from a magnification of the second imaging channel; and
   a single focal plane array image sensor positioned downstream of the beamsplitter to receive the fluorescence and non-florescence light; wherein the image sensor is configured to image the non-fluorescence image light from the first imaging channel onto a first location of the image sensor and image the fluorescence image light from the second imaging channel onto a second image location on the image sensor, wherein the first location on the image sensor is distinct from and non-overlapping with the second location on the image sensor, as, respectively, the non-fluorescence image and the fluorescence image, and wherein the fluorescence image has an image size with a smaller area on the sensor than an image size of the non-fluorescence image.

2. The video camera device of claim 1 further comprising a processor coupled to receive captured fluorescence image and non-fluorescence image from the first imaging channel and the second imaging channel, said processor configured to digitally rescale the fluorescence image to match the size of the non-fluorescence image and overlay it onto non-fluorescence image for display.

3. The video camera device of claim 1, wherein the first and second image locations are on two separate focal plane array image sensors.

4. The video camera device of claim 1, wherein the meniscus lens is a singlet.

5. The video camera device of claim 1, wherein the meniscus lens is a doublet with an overall meniscus shape adapted for correcting chromatic aberrations in white light, and wherein the meniscus lens is the only optical element with an optical power positioned downstream of the beamsplitter and upstream of the image sensor in the one of the first and second imaging channels containing the meniscus lens.

6. The video camera device of claim 1, wherein the magnification of the second imaging channel is 0.5× to 0.9× the magnification of the first imaging channel.

7. The video camera device of claim 6, wherein the meniscus lens functions to reduce the magnification of the second imaging channel.

8. The video camera device of claim 1, wherein the meniscus lens has a first radius $r_1$ and a second radius $r_2$, with a magnification m equal to $r_2/r_1$ being between about 0.56 and 0.88.

9. The video camera device of claim 1, wherein the beamsplitter reflects light of wavelengths corresponding to the fluorescence channel and transmits light of wavelengths corresponding to the non-fluorescent channel.

10. The video camera device of claim 1, wherein the beamsplitter transmits light of wavelengths corresponding to the fluorescence channel and reflects light of wavelengths corresponding to the non-fluorescent channel.

11. The video camera device of claim 1, wherein the beamsplitter reflects ICG/OTL fluorescent light having wavelengths approximately 800-850 nm and transmits light of shorter wavelengths.

12. The video camera device of claim 1, wherein the beamsplitter transmits ICG/OTL fluorescent light having wavelengths approximately 800-850 nm and reflects light of shorter wavelengths.

13. The video camera device of claim 1, wherein the beamsplitter reflects Cy5 or Cy5.5 fluorescent light having wavelengths approximately 650-725 nm and transmits light of shorter wavelengths.

14. The video camera device of claim 1, wherein the beamsplitter transmits Cy5 or Cy5.5 fluorescent light having wavelengths approximately 650-725 nm and reflects light of shorter wavelengths.

15. The video camera device of claim 1, wherein the beamsplitter reflects fluorescein fluorescent light having wavelengths approximately 500-550 nm and transmits light of other wavelengths.

16. The video camera device of claim 1, wherein the beamsplitter transmits fluorescein fluorescent light having wavelengths approximately 500-550 nm and reflects light of other wavelengths.

17. The video camera device of claim 1, wherein the meniscus lens is afocal.

18. The video camera device of claim 1, comprising a means to focus one of the first imaging channel and the second imaging differently than the other.

19. The video camera device of claim 18 wherein the focusing means comprises a mechanism for moving the meniscus lens.

20. The video camera device of claim 19, wherein the moving of the meniscus lens does not change the magnification of the image light passing therethrough.

21. The video camera device of claim 18 wherein the focusing means comprises a mechanism for moving an image sensor corresponding to one of the imaging channels.

22. The video camera device of claim 18 wherein the focusing means comprises a liquid lens having an adjustable deformation.

23. The video camera device of claim 18 further comprising a processor coupled to control the focusing means and which performs an autofocus routine to adjusts the focus of one of the imaging channels automatically.

\*   \*   \*   \*   \*